United States Patent [19]

Suzuki

[11] 4,303,844
[45] Dec. 1, 1981

[54] SMALL D.C. MOTOR

[76] Inventor: Tadashi Suzuki, 6-3, Aza-Uramachi, Kakuda, Kakuda-shi, Miyagi-ken, Japan

[21] Appl. No.: 70,127

[22] Filed: Aug. 27, 1979

[30] Foreign Application Priority Data

Aug. 31, 1978 [JP] Japan ................. 53-119621

[51] Int. Cl.$^3$ ............................. H02K 23/04
[52] U.S. Cl. ....................... 310/154; 310/268
[58] Field of Search ............... 310/159, 268, 190–193, 310/164

[56] References Cited

U.S. PATENT DOCUMENTS

| 3,167,675 | 1/1965 | Vindevogel | 310/268 X |
| 3,204,137 | 8/1965 | Gardes et al. | 310/164 |
| 3,226,586 | 12/1965 | Henry-Baudot | 310/268 X |
| 3,239,705 | 3/1966 | Kavanaugh | 310/268 |
| 3,525,007 | 8/1970 | Henry-Baudot | 310/268 |
| 3,737,697 | 6/1973 | Kitamori et al. | 310/268 |
| 4,079,277 | 3/1978 | Osanai | 310/268 X |
| 4,188,556 | 2/1980 | Hahn | 310/154 X |
| 4,208,784 | 6/1980 | Kincel | 310/268 X |

FOREIGN PATENT DOCUMENTS 43-3443 of 0000 Japan .

Primary Examiner—Donovan F. Duggan
Attorney, Agent, or Firm—Guy W. Shoup; Gerard F. Dunne

[57] ABSTRACT

A D.C. motor is disclosed having a magnetic plate disposed on the upper surface of the rotor for normally urging a rotor of the motor downwards. The spacing between the magnetic plate and a cover plate of the motor is made larger than the spacing of the rotor from the cover plate to ensure that the magnetic plate will not be unduly attracted to the cover plate.

8 Claims, 2 Drawing Figures

SMALL D.C. MOTOR

The present invention relates to D.C. motors, and more particularly, to small D.C. motors having armatures with minimum mass.

Motors employing an armature having reduced mass in order to lower power consumption and to quicken the response are known. Typically, such armatures have their cores made from a light weight material, or they simply have no core at all in order to reduce the mass of the armature. On account of the light weight of such armatures, however, they have the disadvantage that oscillations in the axial direction of the rotating elements are liable to occur during the rotation of the armature.

An object of the present invention is to provide a small D.C. motor having an armature of low mass and yet can eliminate oscillations in the direction of the rotational axis.

Another object of the present invention is to provide such a motor which is simple in structure and can be mass produced easily.

Still another object of the present invention is to provide such a motor having a structure for preventing axial oscillations of the armature which can be fixed quite easily to the armature.

According to the present invention, a motor is provided which includes a magnetic element mounted concentrically to the rotor on the side thereof opposite to the permanent field magnet. In this way, the rotor is continuously urged towards the permanent magnet in order to damp any oscillations. Further, the portion of the motor housing adjacent the magnetic element is raised therefrom to prevent contact therewith.

Other objects, features and advantages of the present invention will become apparent from the following description of a preferred embodiment illustrated in the accompanying drawings, in which.

Figure 1:
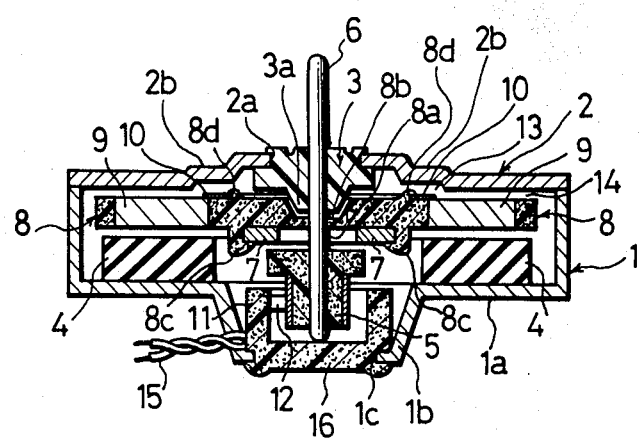
FIG. 1 is a sectional side view of a preferred embodiment of the present invention.

Referring to FIG. 1, a substantially cylindrical housing 1 has an open upper end closed by a generally disc shaped cover plate 2 and a bottom wall 1a having a central portion 1b depending therefrom. The housing and cover plate are formed from a magnetic material. A bearing member 3 which has a protuberance 3a protruding in the axial direction of the motor is fitted in a central hole 2a of the cover plate 2. A field permanent magnet 4 is fixed to the bottom wall 1a inside the housing 1. The magnet 4 is ring-shaped, and is provided with a predetermined number of magnetic poles, as is well known. A commutator member 5 is fixed to a shaft 6 by suitable means and comprises a plurality of segments fixed around the shaft 6. Numeral 7 designates a varistor which is formed with electrodes on its surface. A rotor 8 made of a synthetic resin material such as epoxy resin or polyacetal resin has a plurality of coils 9 embedded therewithin. The rotor 8 is molded into the shape of a disc. The central part of the rotor 8 is formed with a shaft inserting hole 8a and the central upper surface of the rotor is formed with a recess 8b for receiving the protuberance 3a of the bearing 3. The lower surface of the rotor is integrally formed with a plurality of projections 8c for holding the varistor 7.

Figure 2:
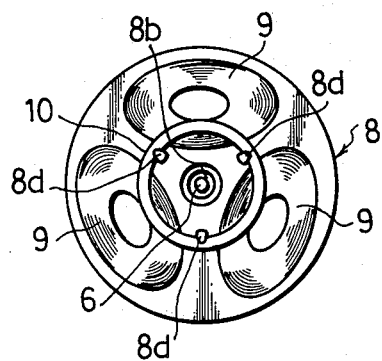
FIG. 2 is a top plan view of the armature in the embodiment of FIG. 1.

As shown in FIG. 2, a ring-shaped magnetic plate 10 made from a magnetic material such as iron is mounted to the rotor by thermally deforming a plurality of protrusions 8d provided integrally on the upper surface of the rotor 8. Likewise, the varistor 7 is mounted by thermally deforming the projections 8c on the lower surface of the rotor 8. A brush holder 11 made of an insulating material such as synthetic resin is provided to hold a brush 12 adapted to slide in contact with the commutator 5. In this embodiment, the brush holder 11 is constructed integrally with a thrust bearing 16 which supports the lower end of the shaft 6, and is secured in a hole 1c provided in the central portion 1b of the housing 1.

As shown in FIG. 1, the cover plate 2 has a raised portion 2b formed by stamping or the like to provide a spacing 13 between the inner wall of the cover plate 2 and the magnetic plate 10 which is larger than the spacing 14 between the inner wall of the cover plate and the periphery of the armature. Accordingly, even when the shaft 6 is moved upwards, as viewed in FIG. 1, to cause the upper surface of the rotor 8 is abut against the inner wall of the cover plate 2, the magnetic plate 10 will not come into contact with the inner wall of the cover plate 2. The operation of the motor is the same as that of conventional torque motors, and will not be described in detail. However, when a voltage is applied across leads 15 to cause current to flow through the coils 9, the rotor 8 rotates across the magnetic flux between the magnet 4 and the cover plate 2. In this case, the magnetic plate 10 on the rotor 8 is attracted downwards, as viewed in the drawing, by means of the magnet 4. Thus, the lower end of the shaft 6 is continually urged against the thrust bearing 16 to thereby prevent any play in the axial direction of the motor to ensure a stable rotation of the rotor 8 free of oscillations. Even in case where the rotor 8 has abutted against the cover plate 2 due to the movement of the rotor 8 towards the cover plate 2 when, for example, a belt is attached to a motor pulley (not shown) mounted on the outer end of the shaft 6, the presence of the spacing 13 prevents the magnetic plate 10 from contacting the cover plate 2. More specifically, in the absence of the spacing 13, when the magnetic plate 10 and the cover plate 2 have contacted, the contact force between the cover plate 2 and the magnetic plate 10 is stronger than the downward attractive force of the magnetic plate 10 owing to the magnet 4. Accordingly, when the motor is started in that condition in which the rotor 8 is not restored to the original state, a contact noise between the magnetic plate 10 and the cover plate 2 originates upon initiation of the rotation. Moreover, current increases because a torque in the direction inverse to that of the rotation acts. In contrast, according to the present invention, even when the rotor 8 has moved towards the cover plate 2, the magnetic plate 10 does not contact with the cover plate 2 and is always returned to the original fixed position by the attraction of the magnet 4, so that the motor can be stably started. Nevertheless, the spacing between the coils 9 embedded in the rotor 8 and the cover plate 2 can be made small, in order not to increase the overall size of the motor.

What is claimed is:

1. A motor including
  a substantially cylindrical housing made from a magnetic material;
  a rotor member mounted within said housing and having a plurality of coils formed therein;

a rotary shaft held to a center portion of said rotor member;

a permanent magnet fixed in said housing and spaced from one surface of said rotor member;

a magnetic element held concentrically to the other surface of said rotor member;

a thrust bearing secured adjacent said permanent magnet to said housing and adapted to receive an end portion of said rotory shaft; and the wall portion of said housing adjacent said magnetic element having a raised portion formed therein adjacent to said magnetic element.

2. The miniature motor according to claim 1, said thrust bearing being formed of a synthetic resin and having a brush holder formed integrally therewith.

3. A motor according to claim 1, said rotor member being made of a synthetic resin and its upper surface being formed integrally with a plurality of first protrusions for fixing said magnetic element.

4. A motor according to claim 3, said magnetic element being held by said first protrusions and fixed to said rotor member by thermally deforming said protrusions.

5. A motor according to claim 1, further including a varistor fixed to said one surface of said rotor member, said varistor being fixed concentrically with said rotor member.

6. A motor according to claim 5, said rotor member being made of a synthetic resin, and its lower surface being formed integrally with a plurality of second protrusions for fixing said varistor.

7. A motor according to claim 6, said varistor being held by said second protrusions and being fixed to said rotor member by thermally deforming said protrusions.

8. A motor according to claim 1, said magnetic element being generally ring shaped.

* * * * *